(12) United States Patent
Tseng et al.

(10) Patent No.: US 8,069,838 B2
(45) Date of Patent: Dec. 6, 2011

(54) SPARK TIMING ADJUSTMENT BASED ON VEHICLE ACCELERATION

(75) Inventors: Hongtei Eric Tseng, Canton, MI (US); Diana Yanakiev, Canton, MI (US); Davor David Hrovat, Ann Arbor, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 812 days.

(21) Appl. No.: 12/173,296

(22) Filed: Jul. 15, 2008

(65) Prior Publication Data

US 2010/0012087 A1    Jan. 21, 2010

(51) Int. Cl.
  *F02P 5/145* (2006.01)
  *F02P 5/00* (2006.01)
  *F02D 45/00* (2006.01)
(52) U.S. Cl. .................................. 123/406.12
(58) Field of Classification Search ............. 123/406.12, 123/406.23, 406.53, 406.55; 701/51, 53, 701/87, 111
See application file for complete search history.

(56) References Cited

U.S. PATENT DOCUMENTS

| | | | |
|---|---|---|---|
| 5,224,452 A | 7/1993 | Tomizawa | |
| 5,577,474 A | 11/1996 | Livshiz et al. | |
| 5,762,366 A | 6/1998 | Faye | |
| 5,857,445 A | 1/1999 | Shimada et al. | |
| 6,334,424 B1 | 1/2002 | Ito | |
| 6,553,958 B1 | 4/2003 | Kolmanovsky et al. | |
| 6,751,543 B2 | 6/2004 | Gras et al. | |
| 7,213,573 B2 | 5/2007 | Daniels et al. | |
| 7,762,232 B2 * | 7/2010 | Pursifull et al. | 123/406.12 |
| 7,917,275 B2 * | 3/2011 | Doering et al. | 701/87 |
| 2010/0017101 A1 * | 1/2010 | Leone et al. | 701/111 |

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Systems, methods and a processor are provided for adjusting the spark timing of an internal combustion engine. The systems, methods and processor include adjusting the spark timing of an internal combustion engine configured to power a vehicle toward peak torque timing based on an output of a longitudinal acceleration sensor configured to sense a longitudinal acceleration of the vehicle.

23 Claims, 8 Drawing Sheets

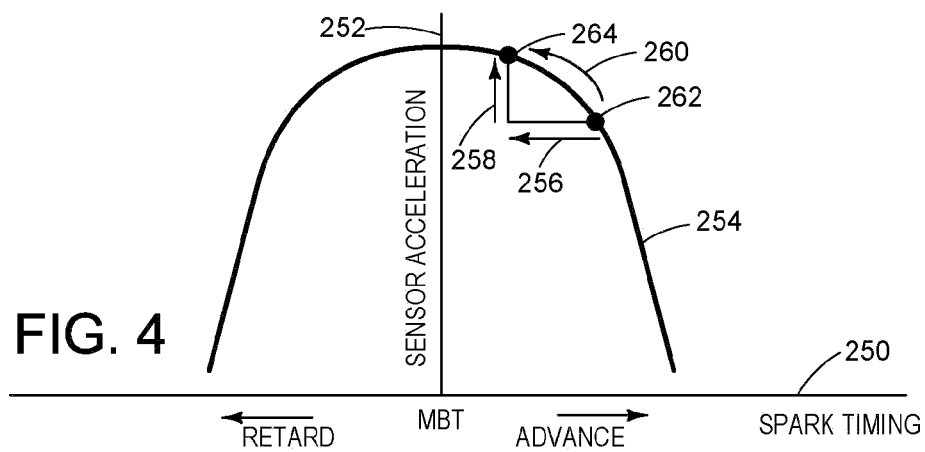
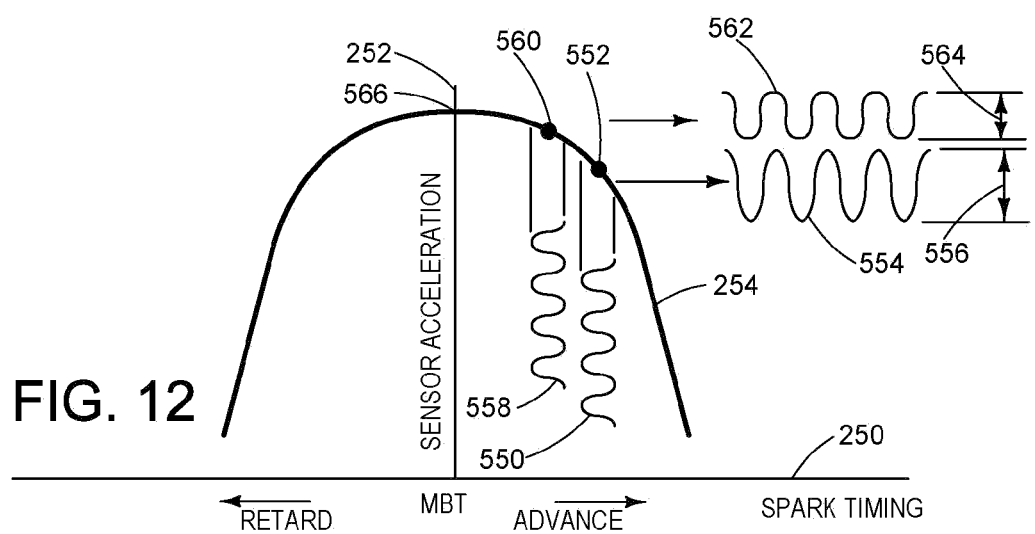
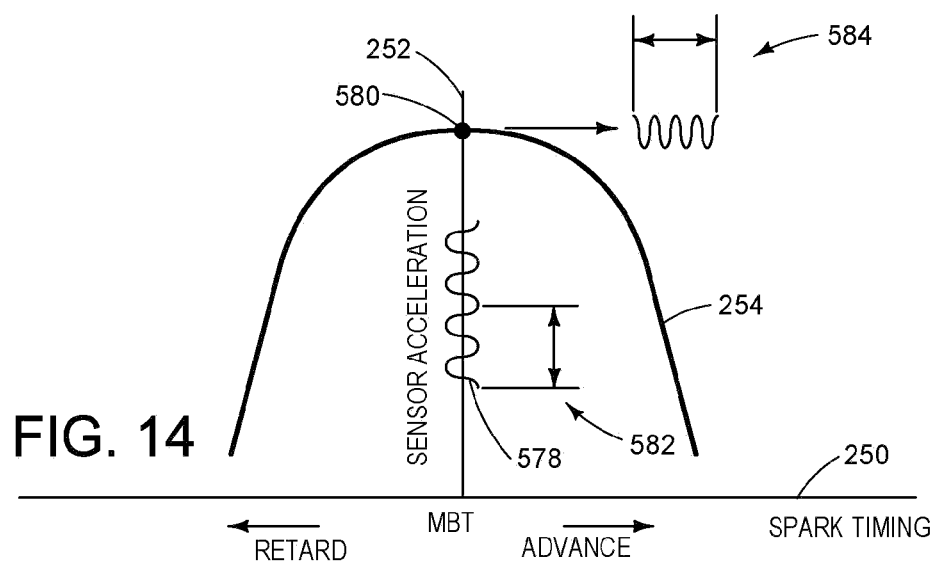

SPARK TIMING ADJUSTMENT BASED ON VEHICLE ACCELERATION

BACKGROUND AND SUMMARY

Output performance of internal combustion engines may vary significantly depending on the setting of various engine operating parameters, such as air-fuel ratio, spark timing, etc. In one particular example, spark timing, and more specifically settings for minimum timing for best torque (MBT), may affect vehicle fuel economy.

Typically, MBT spark timing is determined based on the results obtained from engine mapping. However, part variation and operating condition variations, even when extensively mapped, may still cause the spark to be set at a value providing less torque than another value closer to the actual MBT timing.

One approach to provide a feedback to control output torque and thereby address engine mapping errors is provided in U.S. Pat. No. 7,213,573. This example provides a system and associated subsystems that use a detected ionization signal to, among other things, control MBT timing.

However, the inventors herein have recognized a number of potential disadvantages with such an approach. As one example, the ionization current measuring circuit in the combustion chamber may degrade unpredictably due to part variation and differences in wear characteristics over time. Wear characteristics may be particularly difficult to predict for components located in harsh environments such as combustion chambers.

Thus, in one approach, a method is provided that includes adjusting the spark timing of an internal combustion engine configured to power a vehicle toward peak torque based on an output of a longitudinal acceleration sensor configured to sense a longitudinal acceleration of the vehicle. In this way, it may be possible to reduce reliance on sensors in harsh environments, and thereby reduce the uncertainties associated with component variation, and component aging. However, it should be appreciated that such an approach may also be combined with feedback from other sensors, such as an ionization sensor located in the combustion chamber, for example.

In one particular aspect, the spark timing may be adjusted during a steady state of the vehicle while the vehicle is in operation on a driving surface. The adjustment may be made on-line (in-vehicle) in real-time without, or in addition to, engine mapping data. Another aspect may thus provide measurement and feedback adaptation, which can form a closed-loop control. The adaptation and closed-loop control may increase the robustness against piece variations, aging and other disturbances, and also may enhance fuel efficiency and performance for individual engines by allowing individual compensation. Another aspect may make automated calibration possible with initial calibration, and refinement adaptation may also be possible to significantly enhance customer observed fuel economy.

DESCRIPTION OF THE FIGURES

FIG. 4 shows graph indicating an example relationship between spark timing adjustment and a sensed longitudinal acceleration;

FIG. 12 shows graph indicating an example relationship between spark timing adjustment and a sensed longitudinal acceleration;

FIG. 14 shows graph indicating an example relationship between spark timing adjustment and a sensed longitudinal acceleration.

DETAILED DESCRIPTION

Figure 1:
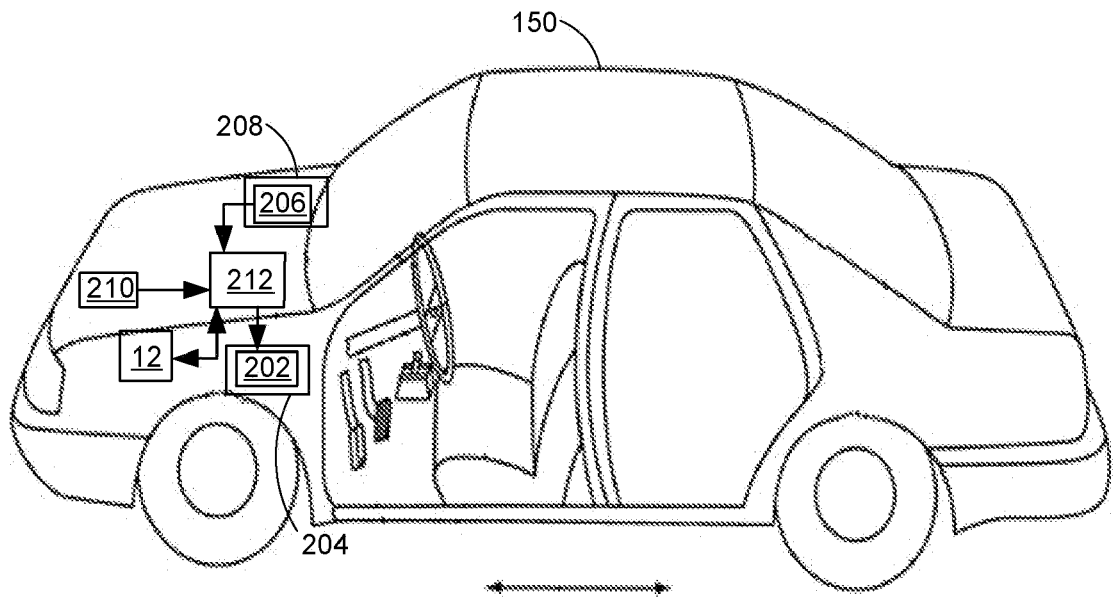
FIG. 1 shows a schematic representation of a vehicle illustrating example locations wherein longitudinal acceleration sensor may be place on the vehicle in accordance with the invention.
Figure 2:
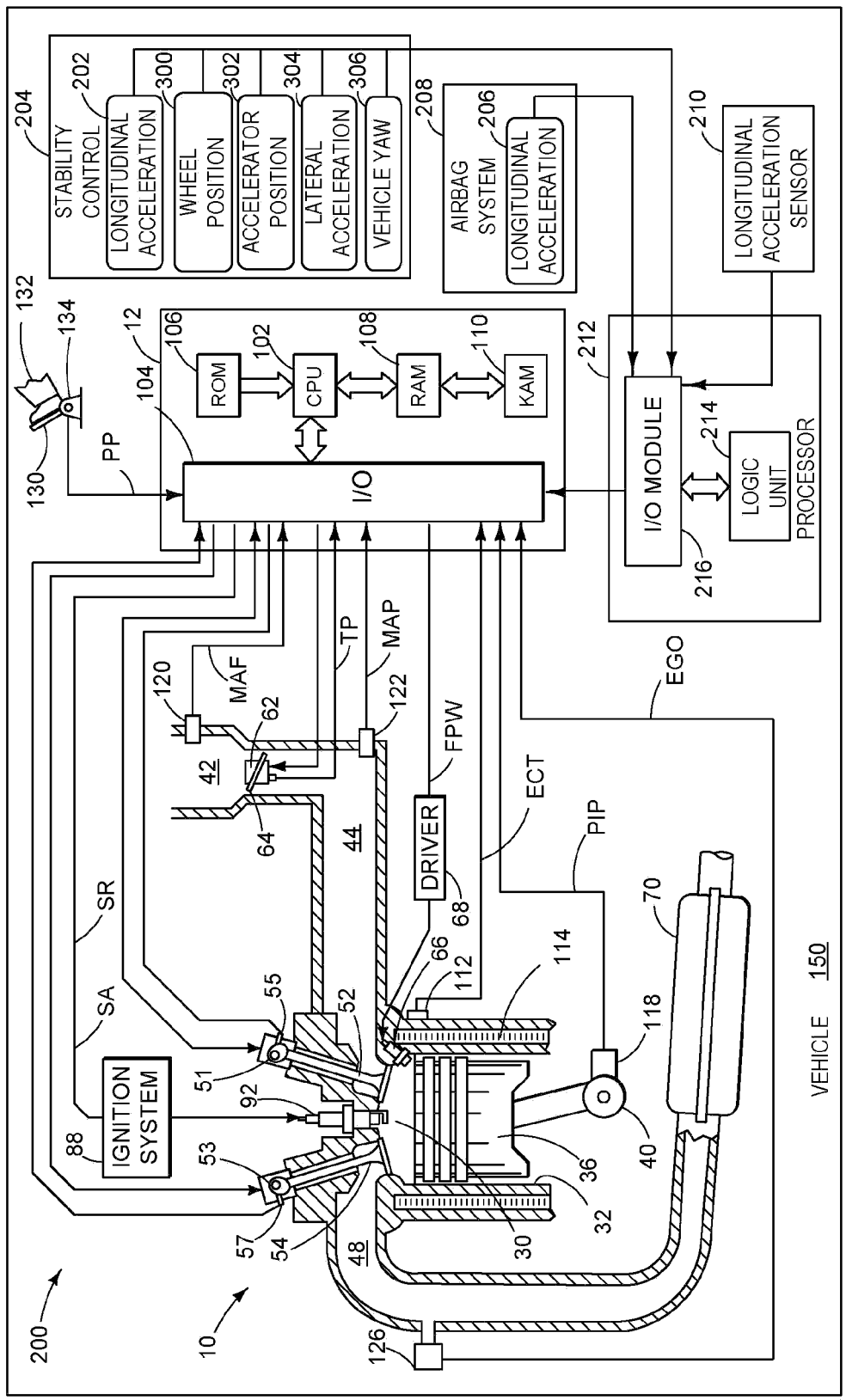
FIG. 2 shows a schematic engine diagram of an example internal combustion engine.

FIG. 1 is a schematic illustration of a vehicle 150, and FIG. 2 is a schematic illustration of a system 200 that may be included in the vehicle 150. The vehicle 150 and the system 200 may have one or more longitudinal acceleration sensors in accordance with various embodiments. Various numbers and configurations of acceleration sensors may be used. One or more longitudinal acceleration sensors that may already be present on the vehicle 150 may be used, or one or more longitudinal acceleration sensors may be added to the vehicle 150. Three longitudinal acceleration sensors are illustrated in FIGS. 1 and 2. One longitudinal acceleration sensor 202 may be included as part of a stability control 204 for the vehicle 150. The stability control 204 may be an electronic stability control (ESC) or a rollover stability control (RSC), or the like. Another longitudinal acceleration sensor 206 may be included as part of an airbag system 208 for the vehicle 150. Another longitudinal acceleration sensor 210 may be an added to the vehicle 150.

Each of the longitudinal sensors may be coupled with a processor 212. The processor 212 may be configured to effect an advance or a retarding of a spark timing of an internal combustion engine 10 configured to power the vehicle 150 based on an output from one or more of the longitudinal acceleration sensors 202, 206, 210. The processor 212 may further be configured to effect a spark timing adjustment of the engine toward a peak torque timing.

The processor 212 may be operatively coupled with an engine controller 12. The system 200 may include an ignition system 88 that may be configured to provide an ignition spark to combustion chamber 30 via spark plug 92 in response to a spark advance signal SA, or a spark retard signal SR from engine controller 12, under select operating modes, and in accordance with instructions from the processor 212. The processor 212 may include a logic unit 214 configured to output a spark timing control signal to the engine controller 12 to adjust the spark timing of the internal combustion engine 10 of the vehicle 150 in a first direction. The logic unit 214 may be further configured for further adjusting the spark timing in the first direction in the case of a positive acceleration or to adjust the spark timing in a second direction in the case of a negative acceleration.

The processor 212 may also include an input/output module 216 configured to receive a signal from the longitudinal acceleration sensor and configured to pass the signal to the logic unit 214. Alternatively, the processor 212, and/or functions described herein may be included as part of the engine controller 12, and may, in particular, be included as part of a microprocessor unit (CPU) 102.

Engine controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Engine controller 12 may receive various signals from sensors coupled to engine 10, in addition to those signals previously, and hereinafter, discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by engine controller 12 from signal PIP.

The spark timing adjustment, i.e. an adjusting, may occur upon recognizing a steady state of the vehicle while the vehicle is in operation on a driving surface. The system 200 may include various sensors, in addition to the one or more longitudinal acceleration sensors 202, 206, 210 that may be configured to recognize the steady state. For example, a wheel position sensor 300 may be coupled to the processor 212, and configured to sense a wheel position that is substantially unchanged for more that a predetermined amount of time; an accelerator position sensor 302 may be coupled to the processor 212, and configured to sense an accelerator position being substantially unchanged for a predetermined length of time; a lateral acceleration sensor 304 may be coupled to the processor 212, and configured to sense changes in lateral acceleration being below a predetermined threshold for more than a predetermined amount of time; and a vehicle yaw sensor 306 may be coupled to the processor 212, and configured to sense changes in yaw of the vehicle being below a predetermined threshold for more than a predetermined amount of time. The accelerator position sensor 302 may be the same, or different than the pedal sensor 134 discussed below.

The processor 212 may be further configured to adjust the spark timing in an oscillating manner about a first nominal spark timing at a predetermined frequency, and to measure a first amplitude of an outputted oscillating acceleration signal from the longitudinal acceleration sensor 202, 206, 210. The processor 212 may be further configured to further adjust the spark timing in a similarly oscillating manner about a second nominal spark timing at the predetermined frequency, or another predetermined frequency, and to further measure a second amplitude of a second outputted oscillating acceleration signal from the longitudinal acceleration sensor. The processor 212 may also be further configured to determine weather the peak torque timing is closer to the first nominal spark timing or the second nominal spark timing based on a relative difference between the first amplitude and the second amplitude.

FIG. 2 illustrates one cylinder of multi-cylinder engine 10, which may be included in a propulsion system of an automobile. Engine 10 may be controlled at least partially by a control system including the engine controller 12 and by input from a vehicle operator 132 via an input device 130. In this example, input device 130 includes an accelerator pedal and the pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In some embodiments the intake valve 52 may be controlled by engine controller 12 via electric valve actuator (EVA) 51. Similarly, exhaust valve 54 may be controlled by engine controller 12 via EVA 53. During some conditions, engine controller 12 may vary the signals provided to actuators 51 and 53 to control the opening and closing of the respective intake and exhaust valves. The position of intake valve 52 and exhaust valve 54 may be determined by valve position sensors 55 and 57, respectively.

In various other embodiments intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by engine controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Various embodiments may use what is known as port injection. In such a configuration fuel injector 66 may be arranged in intake passage 44 to provide fuel into the intake port upstream of combustion chamber 30. Fuel injector 66 may inject fuel in proportion to the pulse width of signal FPW received from engine controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

In various other embodiments fuel injector 66 may be coupled directly to combustion chamber 30 for injecting fuel directly therein in proportion to the pulse width of signal FPW received from engine controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by engine controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to engine controller 12 by throttle position signal TP. Intake passage 42 may include a mass air flow sensor 120 and a manifold air pressure sensor 122 for providing respective signals MAF and MAP to engine controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

As described above, FIG. 2 shows only one cylinder of a multi-cylinder engine, and that each cylinder may similarly include its own set of intake/exhaust valves, fuel injector, spark plug, etc.

Figure 3:
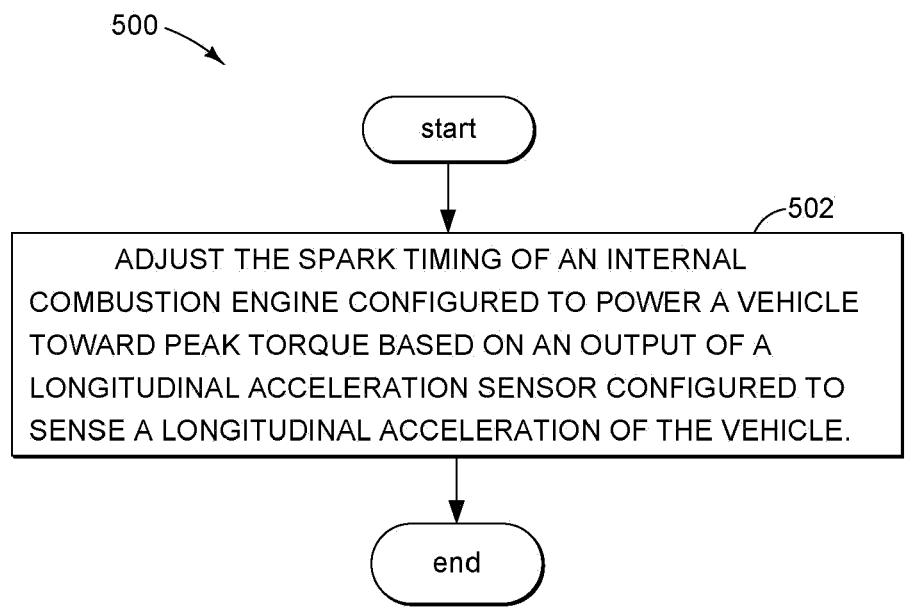
FIG. 3 shows a flow chart illustrating an example method.

FIG. 3 is a flow chart illustrating an example method in accordance with an embodiment. The method 500 may include, at 502, adjusting the spark timing of an internal combustion engine configured to power a vehicle toward peak torque timing based on an output of a longitudinal acceleration sensor configured to sense a longitudinal acceleration of the vehicle. For example, the method may include adjusting the spark timing in various ways around what is considered to be MBT timing. Further, the method may also include correlating a response of one or more acceleration sensors to the spark adjustment. From this correlation, it can be determined whether the spark timing considered to be MBT timing is actually MBT, or whether the spark timing should be adjusted one way or another. As just one example, spark timing may be set to what is considered to be a slightly retarded from MBT position, and then adjusted about that value. During the adjustment, the system may then monitor the resulting acceleration, and determine from correlation between the monitored acceleration and spark timing adjustment whether the spark settings should be adjusted so that what is considered to be MBT better correlates to the actual MBT timing. Various additional examples and further details are described herein below.

FIG. 4 is a graph illustrating a relationship between spark timing 250 and a sensed longitudinal acceleration 252 with curve 254. In this example, a spark timing adjustment 256 in a retarding direction may yield a positive change in a sensed acceleration 252 of the vehicle 150. The acceleration may be sensed by one or more of the longitudinal sensors 202, 206, and/or 210. The change in acceleration may be attributed to an increased torque effected by the change in spark timing, and may be illustrated by a movement 260 along the curve 254 from point 262 to point 264.

Figure 5:
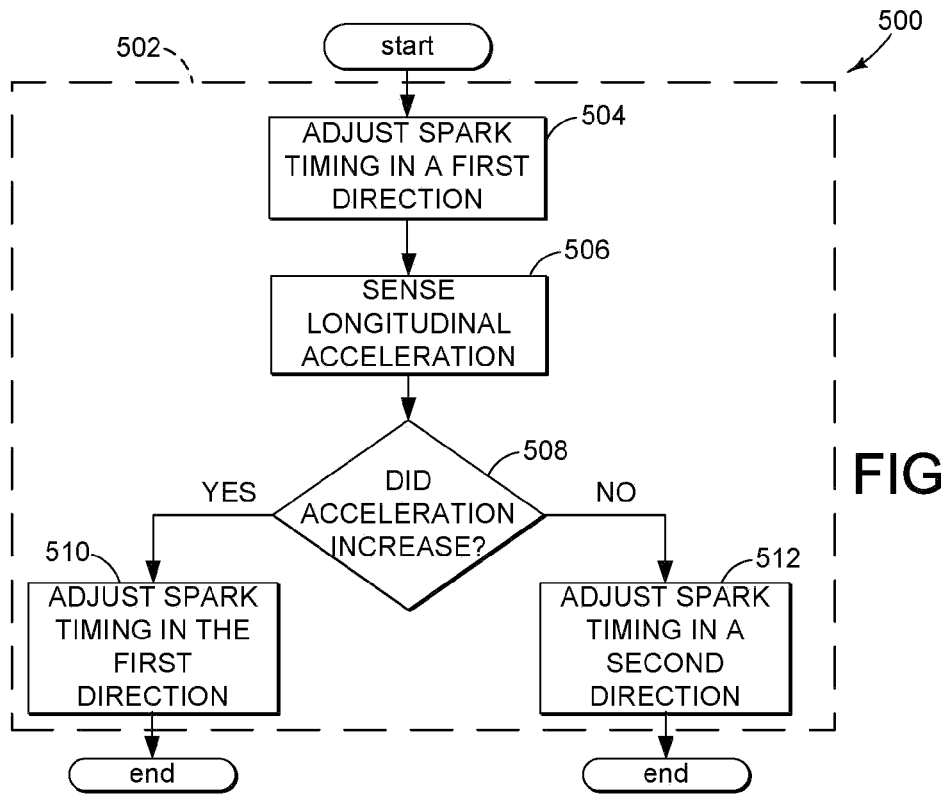
FIGS. 5-11 show flow charts illustrating example methods.

FIG. 5 is a flow chart illustrating a variation of the method 500 illustrated in FIG. 3. The adjusting, as shown in FIG. 3, at 502, may be done in various ways. An example variation is illustrated in FIG. 5 within block 502. The adjusting may include, at 504, adjusting the spark timing in a first direction i.e. in a retarded or an advanced direction. In this example the first direction may be in a retarded direction. The method 500 may include, at 506, sensing the longitudinal acceleration attributable to the spark timing adjustment with, for example one or more acceleration sensors. Then at decision block 508, the method 500 may include determining if the longitudinal acceleration has increased, or decreased. If, for example, the acceleration is determined to increase, then the spark timing adjustment may be assumed to be in the first direction, i.e. in the retarded direction. In which case, as illustrated at 510, the method may include further adjusting the spark timing in the first, i.e. retarded direction. However, if the acceleration is determined to decrease, then the spark timing adjustment may be assumed to be in the second direction, i.e. in the advanced direction. In which case, as illustrated at 512, the spark timing may then be adjusted in the second direction.

The method 500 may be used to hunt for the actual MBT timing. The method may be used as a tool to recalibrate the engine. In this way, a more accurate MBT timing may be achieved and may be updated real-time and independent of part variability and the age and wear of the engine components.

Figure 6:
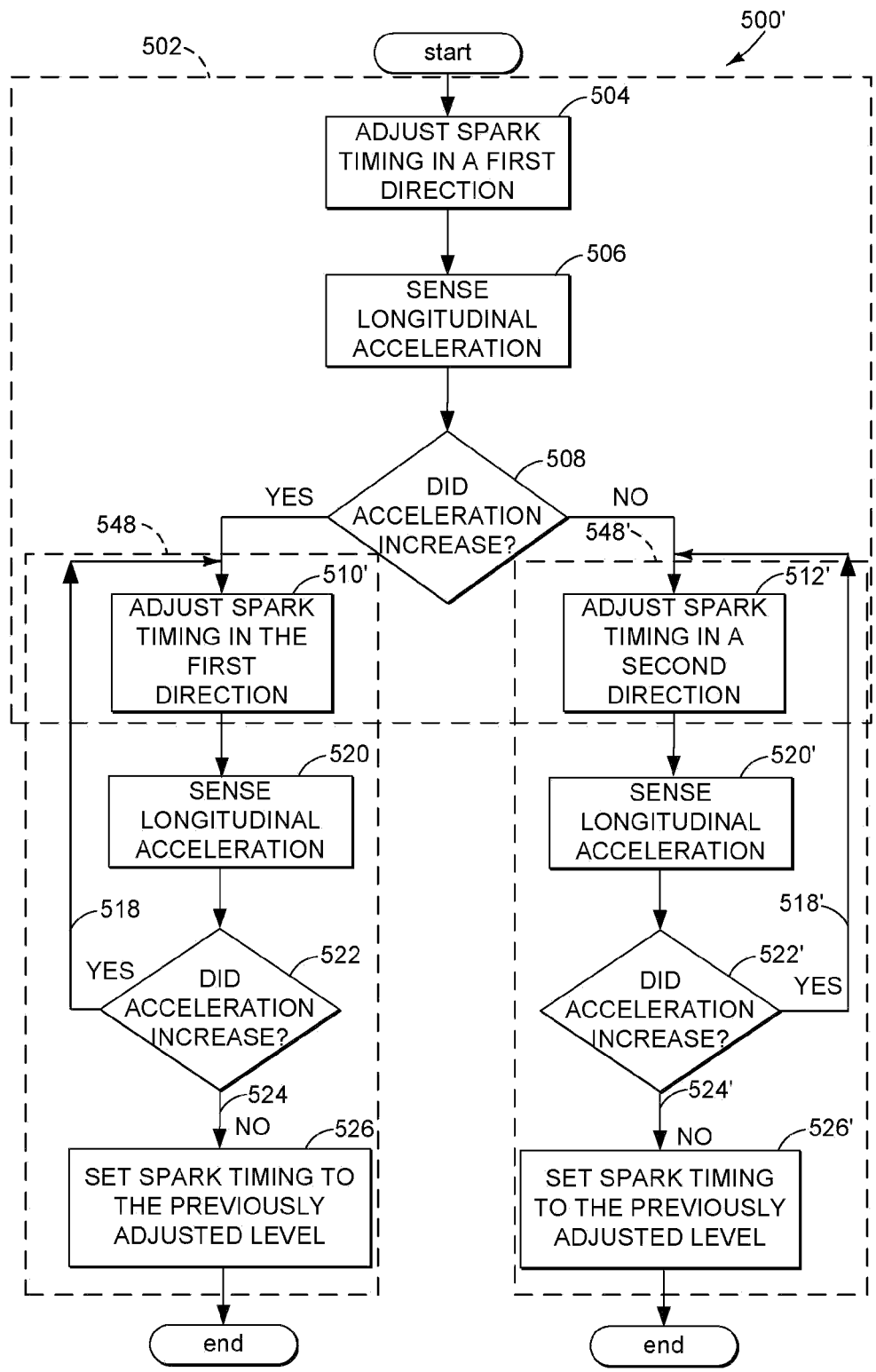

FIG. 6 is a flow chart illustrating a variation of the method 500 illustrated in FIG. 5. The method 500' may further include, at 518 or at 518', iteratively adjusting the spark timing in the first direction, or in the second direction. After a first adjustment, at 504 and a first sensing of a resulting acceleration, at 506 as, described with regard to FIG. 5, then a likely direction toward peak torque may be established. Then with the likely direction established repeated incremental adjustments may be made in the likely direction, and the result measured each time.

In a first case, where the likely direction is in a first direction, repeated incremental adjustments may be made in the first direction as illustrated with the operations described in blocks 510' 520 and 522. The value of the acceleration attributable to the adjustment made at 510', and sensed at 520, may be checked at block 522. If the value of the acceleration is still positive then the method may loop back to 510' as illustrated with line 518.

In a second case, where the likely direction is in a second direction, repeated incremental adjustments may be made in the second direction as illustrated with the operations described in blocks 512' 520' and 522'. The value of the acceleration attributable to the adjustment at 512' and sensed at 520' may be checked at block 522'. If the value of the acceleration is positive then the method may loop back to 512' as illustrated with line 518'.

The iterations may be continued in the respective one or the other of the first direction and the second direction until, at 524, 524', the acceleration decreases. What is considered to be MBT timing may then be gradually and progressively adjusted toward the actual MBT timing.

The method 500' may further include upon determining, a negative acceleration at 524, 524', following respective flow diagram lines at 524, 524'. Then the spark timing may be set to a previously adjusted level of an immediately prior iteration, as illustrated at 526, 526'.

Figure 7:
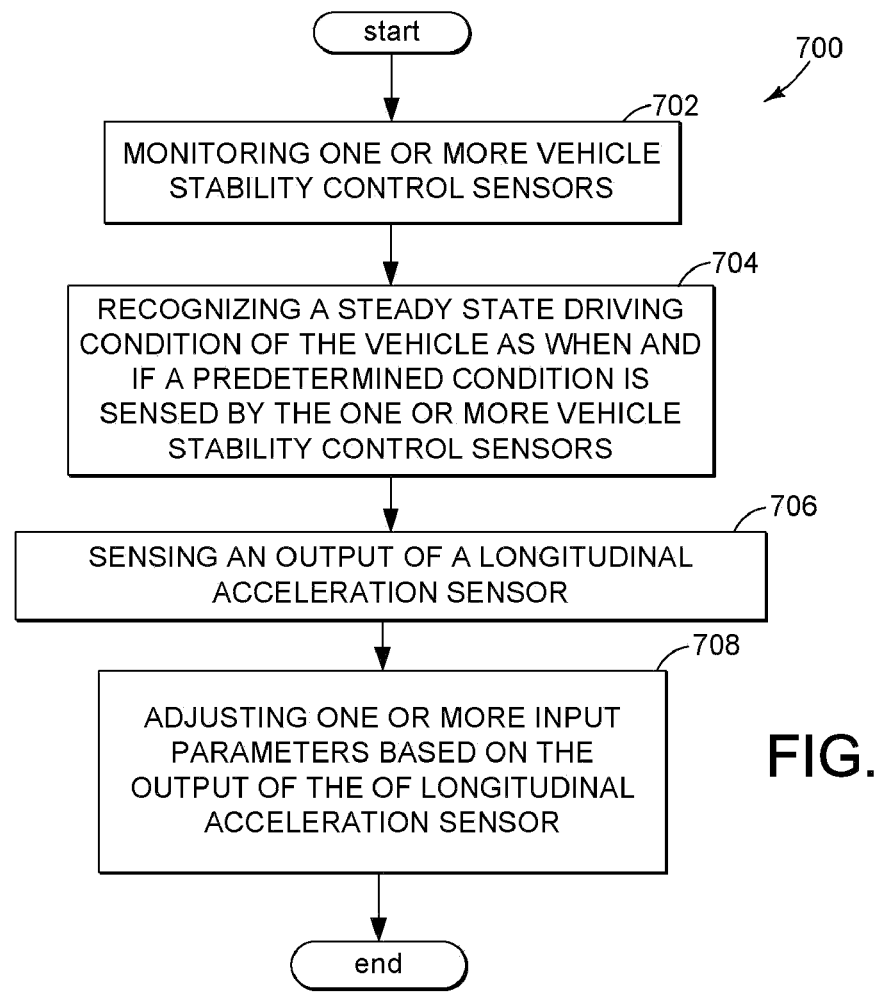

FIG. 7 is a flow chart illustrating a method 700 of adjusting one or more vehicle engine input parameters such as spark timing, to effect an improved engine output, such as, for example, maximum engine torque, or minimum engine brake specific fuel consumption, in accordance with a particular embodiment. The method 700 may include, at 702, monitoring one or more vehicle stability control sensors. At 704, recognizing a steady state driving condition of the vehicle as when and if a predetermined condition is sensed by the one or more vehicle stability control sensors. At 706, sensing an output of a longitudinal acceleration sensor; and then at 708, adjusting the one or more input parameters based on the output of the of longitudinal acceleration sensor.

Figure 8:
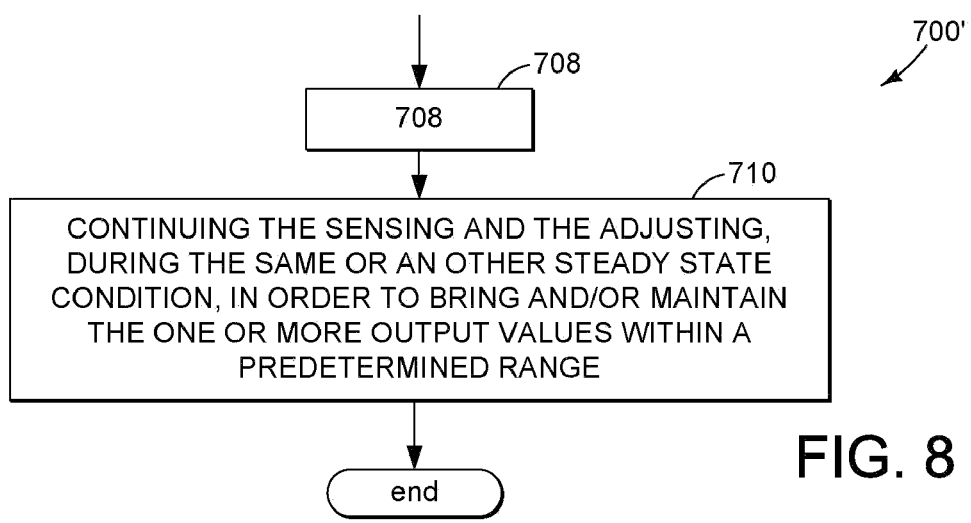

FIG. 8 is a flow chart illustrating a method 700' that may be performed in addition to a method 700 illustrated in FIG. 7.

The method 700' may further include, at 710, continuing the sensing and the adjusting, during the same or another steady state condition, in order to bring and/or maintain the one or more vehicle input parameters within a predetermined range. The one or more vehicle input parameters may be spark timing.

As mentioned, another example embodiment may monitor the brake specific fuel consumption (BSFC) through monitoring the output of longitudinal acceleration sensor and the amount of injected fuel signals appropriately delayed and filtered to match their relative phase/timing. The BSFC may then be improved by adjusting the one or more vehicle engine input parameters. The longitudinal acceleration sensor signal may then provide an indication of the engine/drivetrain torque that is independent of the road gradient. This advantage of road gradient independence may enable robust methodologies.

Figure 9:
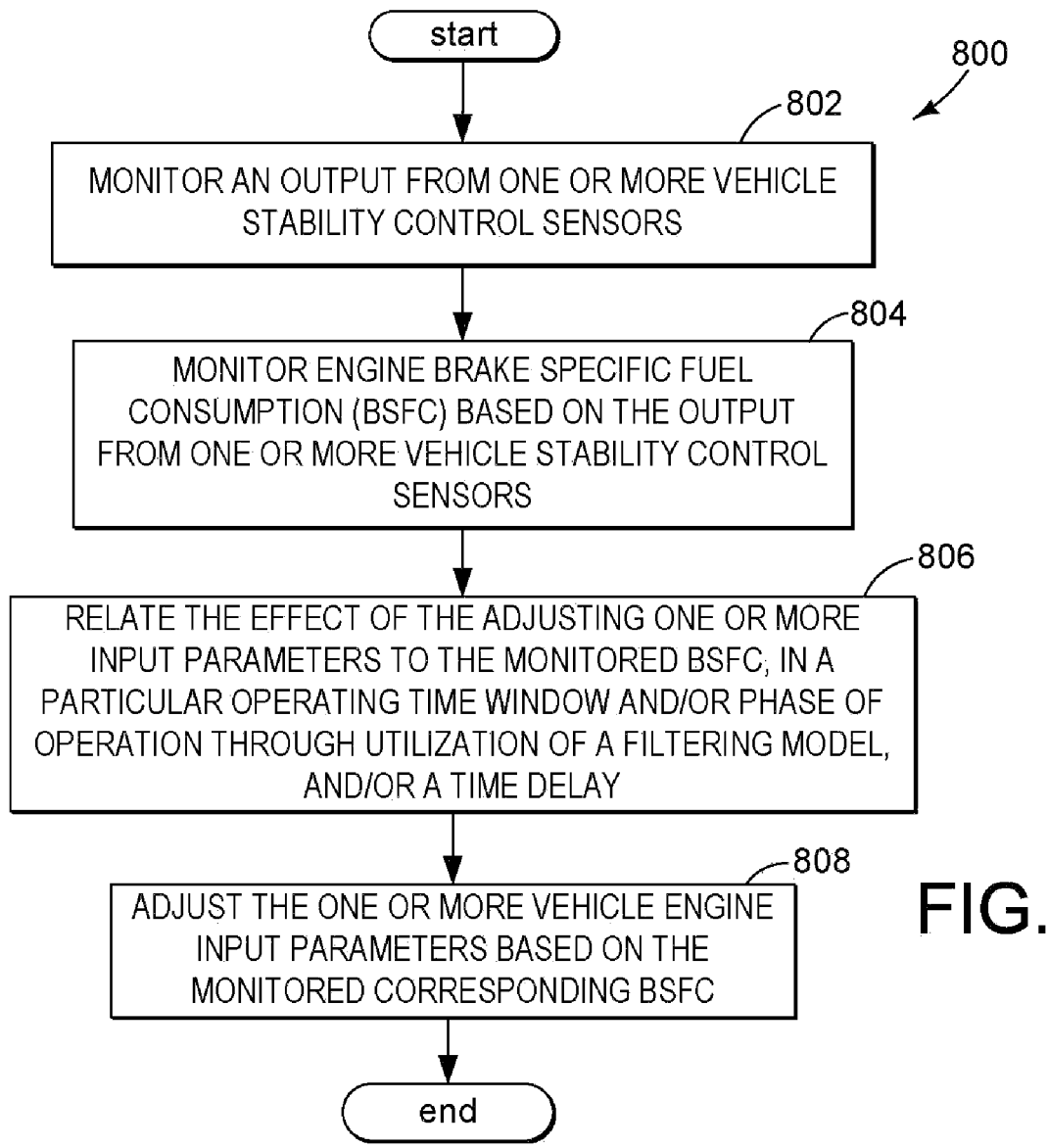

FIG. 9 is a flow chart illustrating another method 800 of adjusting one or more vehicle engine input parameters. The method 800 may include, at 802, monitoring an output from one or more vehicle stability control sensors. Then at 804, monitoring engine brake specific fuel consumption (BSFC) based on the output from one or more vehicle stability control sensors. The method 800 may include, at 806, relating the effect of the adjusting one or more input parameters to the monitored BSFC, in a particular operating time window and/or phase of operation through utilization of a filtering model, and/or a time delay. The filtering method may, for example, include utilizing a second order filter, and may be based on a mass-spring-damper model. The method 800 may also include, at 808, adjusting the one or more vehicle engine input parameters based on the monitored corresponding BSFC. The one or more vehicle engine input parameters is spark timing.

Figure 10:
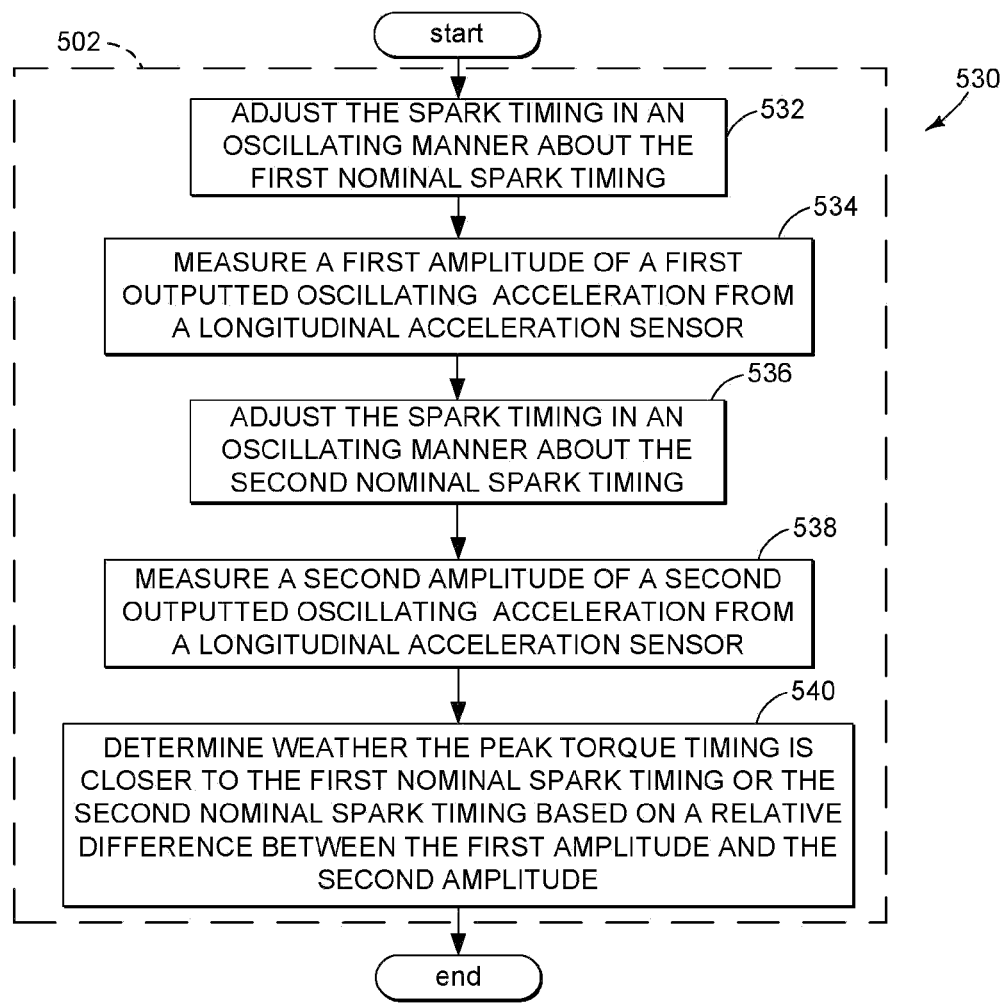

FIG. 10 is a flow chart illustrating a method 530 in accordance with another embodiment. The method may be conducted in addition to, or as an alternative to the method 500 illustrated in one or more of the earlier described FIGS. For example, the adjusting, at 502 illustrated in FIG. 3, may include one or more variations. One variation may include, as illustrated at 532, adjusting the spark timing in an oscillating manner about a first nominal spark timing at a predetermined frequency. Then, at 534, measuring a first amplitude of an outputted oscillating acceleration signal from the longitudinal acceleration sensor. At 536, further adjusting the spark timing in a similarly oscillating manner about a second nominal spark timing at the predetermined frequency, or another predetermined frequency. At 538, further measuring a second amplitude of a second outputted oscillating acceleration signal from the longitudinal acceleration sensor. And at 540, determining weather the peak torque timing is closer to the first nominal spark timing or the second nominal spark timing based on a relative difference between the first amplitude and the second amplitude.

Figure 11:
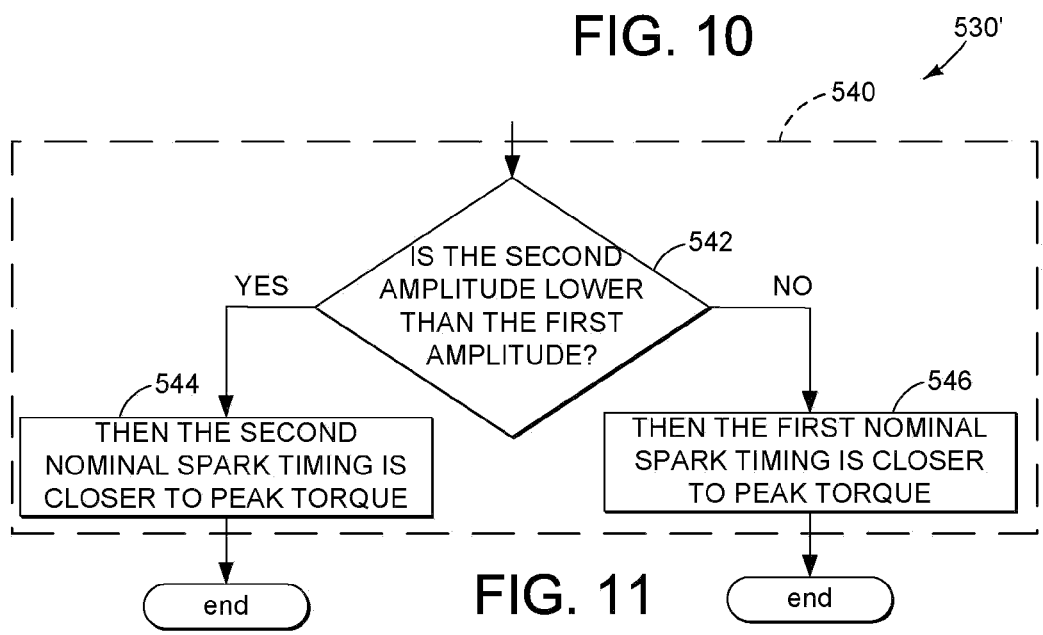

FIG. 11 is a flow chart illustrating a method 530' which may be a variation of the method 530 illustrated in FIG. 10. The determining at 540 in FIG. 10 may include, at 542, concluding the peak torque timing is closer to the second nominal spark timing if, at 544, the second amplitude is lower than the first amplitude. On the other hand, as illustrated at 546, it may be concluded that the peak torque timing is closer to the first nominal spark timing if the second amplitude is greater than the first amplitude. This determination is illustrated with block 542 as a "NO" result.

FIG. 12 is a graph similar to the graph shown in FIG. 4 which may be considered to illustrate this concept. The graph similarly illustrates the relationship between the spark timing 250, and the sensed longitudinal acceleration 252 with curve 254. In this example, a first oscillating spark timing adjustment 550 about a first nominal value 552 may yield a first outputted oscillating acceleration 554 of the vehicle 150, having a first peak to peak amplitude 556. A second oscillating spark timing adjustment 558 about a second nominal value 560 may yield a second outputted oscillating acceleration 562, having second peak to peak amplitude 564. In this example it may be concluded that the peak torque timing 566 is in the direction of the second nominal spark timing 560 because the, the second peak to peak amplitude 564 is less than the first peak to peak amplitude 556.

With the direction of peak torque timing determined, i.e. either in a retarding direction, or an advanced direction, the spark timing may be adjusted toward the peak torque timing. Returning now to FIG. 6, and as illustrated with one of the dashed line boxes 548, 548' the peak torque timing may pursued by, at 518' iteratively, at 510' or 512', adjusting the spark timing toward the peak torque timing until, at 524 or 524', a negative acceleration is detected with the longitudinal acceleration sensor. Then, as illustrated at 526 or 526' the spark timing may be set to a previously adjusted level of an immediately prior iteration.

Figure 13:
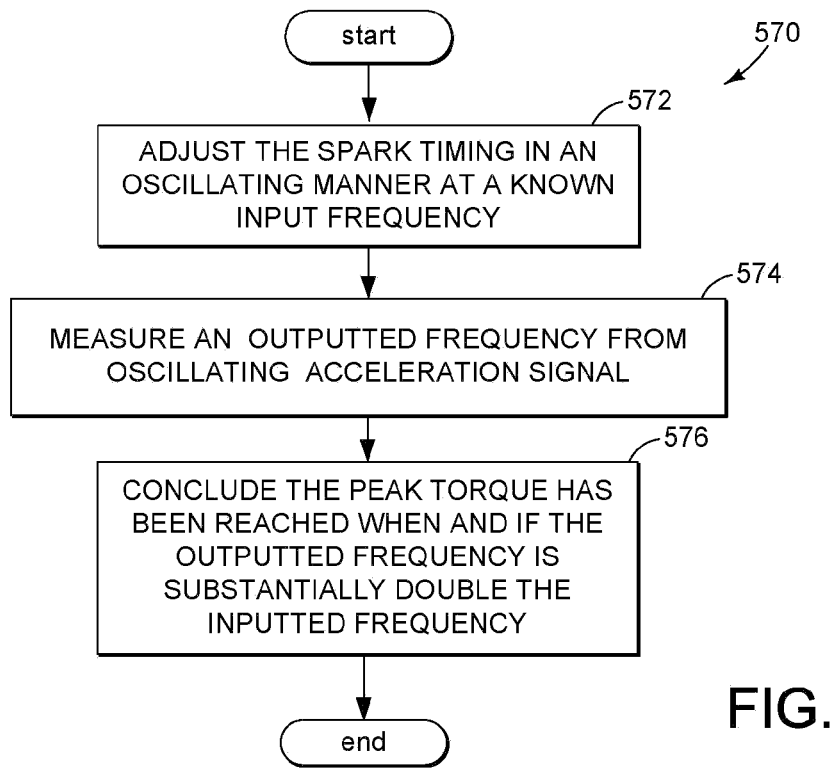
FIG. 13 shows a flow chart illustrating an example method.

FIG. 13 is a flow chart illustrating a method 570 in accordance with another embodiment. The method 570 may be alternative to, or in addition to method 500 illustrated in FIG. 3. The adjusting, at 502 of FIG. 3, may include, at 572, adjusting the spark timing at a known input frequency. The method 570 may further include, at 574, measuring an outputted frequency from the outputted oscillating acceleration signal. At 576, concluding the peak torque timing has been reached when and if the outputted frequency is substantially double the inputted frequency.

FIG. 14 is a graph similar to the graphs shown in FIG. 4, and FIG. 12 which may be considered to illustrate this concept. The graph similarly illustrates the relationship between the spark timing 250, and the sensed longitudinal acceleration 252 with curve 254. In this example, a spark timing may be adjusted in an oscillating manner 578 about a nominal spark timing 580 at an input frequency 582. In this example, an outputted oscillating acceleration signal 584 may be substantially double the spark timing adjustment input frequency 586. It may then be concluded that the nominal spark timing 580 is the peak torque timing.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A system for an internal combustion engine of a vehicle comprising:
    a longitudinal acceleration sensor for sensing a longitudinal acceleration of the vehicle;
    a processor configured to effect a first adjustment in spark timing of the combustion engine, and to correlate a response of the longitudinal acceleration sensor to said first adjustment; and to further set spark timing of the combustion engine based upon the correlation.

2. The system of claim 1 further comprising an engine controller operatively coupled to the processor wherein the processor is configured to effect the first adjustment in the spark timing via the engine controller, and wherein the processor is further configured to:
    adjust the spark timing in a first direction and to receive a signal from the longitudinal acceleration sensor indicating the longitudinal acceleration of the vehicle, and
    adjust the spark timing further in the first direction in the case of a positive acceleration and to adjust the spark timing in a second direction in the case of a negative acceleration.

3. The system of claim 2 wherein the processor is further configured to iteratively adjust the spark timing in one or the other of the first direction and the second direction and to determine if the spark timing change caused an additional positive acceleration, and to continue to adjust the spark timing in the respective one or the other of the first direction and the second direction until the acceleration decreases.

4. The system of claim 1 wherein the processor is further configured to:
    adjust the spark timing in an oscillating manner about a first nominal spark timing at a predetermined frequency, and to measure a first amplitude of an outputted oscillating acceleration signal from the longitudinal acceleration sensor;
    further adjust the spark timing in a similarly oscillating manner about a second nominal spark timing at the predetermined frequency, or another predetermined frequency, and to further measure a second amplitude of a second outputted oscillating acceleration signal from the longitudinal acceleration sensor; and
    determine weather the peak torque timing is closer to the first nominal spark timing or the second nominal spark timing based on a relative difference between the first amplitude and the second amplitude.

5. The system of claim 4 wherein the processor is still further configured to conclude that the peak torque timing is closer to the second nominal spark timing if the second amplitude is lower than the first amplitude, and to conclude the peak torque timing is closer to the first nominal spark timing if the second amplitude is greater than the first amplitude, and to effect an adjustment of the spark timing toward the peak torque timing.

6. The system of claim 1 wherein the processor is further configured to adjust the spark timing in an oscillating manner at a known input frequency, and to measure an outputted frequency from the outputted oscillating acceleration signal, and to conclude the peak torque timing has been reached when and if the outputted frequency is substantially double the inputted frequency.

7. The system of claim 1 wherein the longitudinal acceleration sensor is included in one of an electronic stability control of the vehicle; a roll-over stability control of the vehicle, and an airbag system of the vehicle.

8. A method of adjusting one or more vehicle engine input parameters to effect an improved engine output comprising:
    monitoring one or more vehicle stability control sensors;
    during a steady state driving condition of the vehicle including when and if a predetermined condition is sensed by the one or more vehicle stability control sensors, sensing an output of a longitudinal acceleration sensor; and
    adjusting the one or more vehicle engine input parameters based on the output of the longitudinal acceleration sensor, wherein the one or more vehicle input parameters is spark timing.

9. The method of claim 8, wherein the adjusting further includes determining a minimum timing for best torque (MBT) for the engine; setting a first spark timing for one or more operating conditions of the engine as a spark timing that is estimated to be desired for each respective operating condition; determining a steady state condition while the vehicle is in operation; adjusting the spark timing; measuring a resulting acceleration; reevaluating MBT based on the measured acceleration; and resetting the first spark timing to a second spark timing for the one or more operating conditions of the engine based on the reevaluated MBT.

10. A method of adjusting one or more vehicle engine input parameters to effect an improved engine output comprising:
    monitoring an output from one or more vehicle stability control sensors;
    monitoring engine brake specific fuel consumption (BSFC) based on the output from one or more vehicle stability control sensors;
    relating an effect of the adjusting one or more input parameters to the monitored BSFC, during a selected operating time window and/or phase of operation, via a filter; and
    adjusting the one or more vehicle engine input parameters based on the monitored corresponding BSFC.

11. The method of claim 10 wherein the one or more vehicle engine input parameters include spark timing.

12. A method of operating an internal combustion engine configured to power a vehicle, comprising:
    adjusting a spark timing of the engine toward peak torque timing based on a longitudinal acceleration of the vehicle.

13. The method of claim 12 further comprising correlating an output of a longitudinal acceleration sensor of the vehicle to a first predetermined spark timing adjustment, where the adjusting the spark timing toward peak torque timing includes a further spark timing adjustment based upon the correlation.

14. The method of claim 12, wherein the adjusting includes adjusting the spark timing in a first direction, sensing the acceleration attributable to the spark timing adjustment, further adjusting the spark timing in the first direction in the case of a positive acceleration or adjusting the spark timing in a second direction in the case of a negative acceleration.

15. The method of claim 14, further comprising iteratively adjusting the spark timing in one or the other of the first direction and the second direction and determining if the spark timing change caused an additional positive acceleration, and continuing to adjust the spark timing in the respective one or the other of the first direction and the second direction until the acceleration decreases.

16. The method of claim 15, further comprising upon determining a negative acceleration setting the spark timing to a previously adjusted level of an immediately prior iteration.

17. The method of claim 12, wherein the adjusting includes:
adjusting the spark timing in an oscillating manner about a first nominal spark timing at a predetermined frequency, and measuring a first amplitude of an outputted oscillating acceleration signal from the longitudinal acceleration sensor; and
further adjusting the spark timing in a similarly oscillating manner about a second nominal spark timing at the predetermined frequency, or another predetermined frequency, and further measuring a second amplitude of a second outputted oscillating acceleration signal from the longitudinal acceleration sensor; and
determining weather the peak torque timing is closer to the first nominal spark timing or the second nominal spark timing based on a relative difference between the first amplitude and the second amplitude.

18. The method of claim 17, wherein the determining includes concluding the peak torque timing is closer to the second nominal spark timing if the second amplitude is lower than the first amplitude, and concluding the peak torque timing is closer to the first nominal spark timing if the second amplitude is greater than the first amplitude, and further comprising adjusting the spark timing toward the peak torque timing.

19. The method of claim 17, wherein based on the determining, iteratively adjusting the spark timing toward the peak torque timing until a negative acceleration is detected with the longitudinal acceleration sensor, and then setting the spark timing to a previously adjusted level of an immediately prior iteration.

20. The method of claim 12, wherein the adjusting includes adjusting the spark timing in an oscillating manner at a known input frequency, and further comprising measuring an outputted frequency from an outputted oscillating acceleration signal, and concluding the peak torque timing has been reached when and if the outputted frequency is substantially double the inputted frequency.

21. The method of claim 12, wherein the adjusting occurs upon recognizing a steady state of the vehicle while the vehicle is in operation on a driving surface.

22. The method of claim 21, wherein the steady state of the vehicle includes one or more of:
wheel speed being substantially unchanged for more that a predetermined amount of time;
accelerator position being substantially unchanged for a predetermined length of time;
changes in lateral acceleration being below a predetermined threshold for more than a predetermined amount of time; and
yaw of the vehicle being below a predetermined threshold for more than a predetermined amount of time.

23. The method of claim 12, wherein the longitudinal acceleration sensor is included in one of the electronic stability control of the vehicle; the roll-over stability control of the vehicle, and the airbag system.

* * * * *